Z. T. SWEET, OF EUGENE CITY, OREGON.

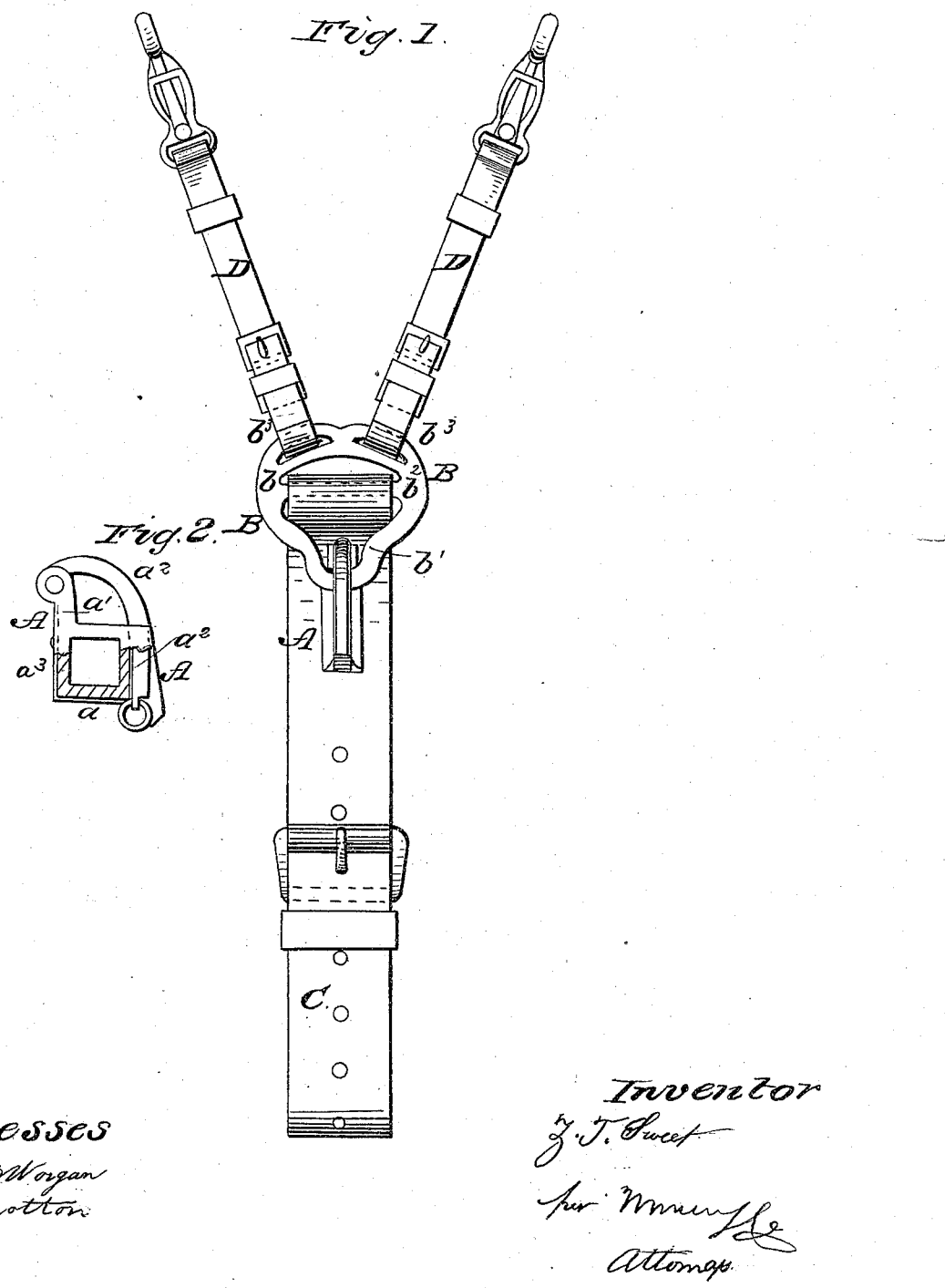

Letters Patent No. 88,676, dated April 6, 1869.

IMPROVED CLIP FOR NECK-YOKE AND WHIFFLE-TREE.

The Schedule referred to in these Letters Patent and making part of the same.

*To all whom it may concern:*

Be it known that I, Z. T. SWEET, of Eugene City, in the county of Lane, and State of Oregon, have invented a new and useful Improvement in Clips for Neck-Yokes and Whiffle-Trees; and I do hereby declare that the following is a full, clear, and exact description thereof, which will enable others skilled in the art to make and use the same, reference being had to the accompanying drawings, forming part of this specification, in which—

Figure 1 represents my improved clip as attached to the martingale and breast-strap of the harness.

Figure 2 is a detail view of the clip, partly in section, to show the construction.

Similar letters of reference indicate like parts.

My invention has for its object to furnish an improved clip for neck-yokes and whiffle-trees, which shall be simple in construction, easily attached and detached, and which shall at the same time be strong and safe; and It consists in the construction of the same, as will be hereinafter more fully described.

A is the clip, through the body of which is formed a square hole, to receive the end of the neck-yoke or whiffle-tree.

Upon the side of the clip A is formed a short arm, $a^1$, having ears formed upon its outer end, to which is pivoted the end of the lock-bar $a^2$.

The lock-bar $a^2$ is made in about the shape shown in fig. 2, that is to say, it is so formed that its free end may enter and lie along a groove formed in the upper side of the body of the clip, as shown in figs. 1 and 2.

Upon the forward end of the lock-arm $a^2$ is formed a catch, which enters a hole in the catch-spring $a^3$.

The rear end of the spring $a^3$ is fastened to the lower side of the body of the clip A, along which it extends, and is bent at right angles, so as to pass up along the side of the said body of the clip A, and has a hole formed in its upper or free end, to receive the catch, formed upon the end of the lock-bar $a^2$.

The free end of the spring $a^3$ is bent over, or has a projection formed upon it, to enable it to be conveniently operated to release the lock-bar $a^2$. The upper or free end of the spring $a^3$ lies under a slight projection of the body of the clip A, to prevent the clip from being unlocked by an accidental blow.

When used in connection with a whiffle-tree, the clip A is attached to the ends of the said whiffle-tree in the same manner as has been described with reference to the neck-yoke. The lock-bar $a^2$ is then passed through the cock-eye of the traces, and secured in place by the catch-spring $a^3$, as before described.

By attaching a cord to the catch-spring $a^3$, and extending it back to the carriage, the horses may be instantly detached from the said carriage, should an accident render it necessary.

Having thus described my invention,

I claim as new, and desire to secure by Letters Patent—

The clip A, formed by the combination of the arm $a^1$, lock-bar $a^2$, and catch-spring $a^3$, with the perforated body of said clip, substantially as herein shown and described, and for the purposes set forth.

Z. T. SWEET.

Witnesses:
J. B. UNDERWOOD,
T. J. HOLLAND.